May 12, 1953
B. W. OSWALT
2,638,186
HYDRAULIC BRAKE ADJUSTER
Filed Jan. 21, 1949
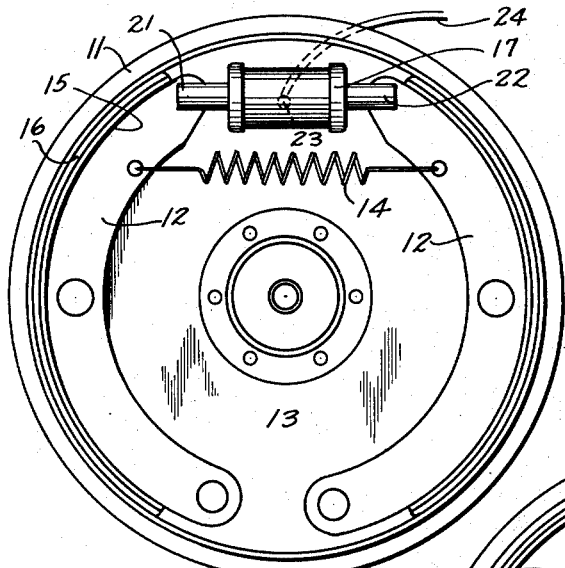
Inventor
Burlin W. Oswalt
Tom Walker
Attorney Patented May 12, 1953

2,638,186

UNITED STATES PATENT OFFICE 2,638,186

HYDRAULIC BRAKE ADJUSTER

Burlin W. Oswalt, Union, Ohio

Application January 21, 1949, Serial No. 71,869

4 Claims. (Cl. 188—152)

This invention relates to hydraulic systems, and particularly to hydraulic actuating cylinders wherein it is desired to automatically adjust the starting position of an extensible piston therein to compensate for variations in the required travel of the piston.

The invention is particularly applicable, although not limited, to hydraulic devices. It functions therein to make automatic compensation for wear of the brake shoes in such manner that the extent of relative movement between the brake shoes and brake drum required to effect a braking operation will remain substantially constant irrespective of wear.

Hydraulic brake adjusters, as such, are not new, but the prior devices have all involved a complicated arrangement of valves and by-pass ports necessitating expensive redesign of the brake units and the use of costly parts therein.

Thus, the object of the present invention is to simplify the construction as well as the means and mode of operation of hydraulic mechanism as disclosed herein whereby such mechanism may not only be economically manufactured, but will be more efficient and uniform in operation, adaptable to a wide variety of installations, having relatively few parts, and be unlikely to get out of repair.

A further object of the invention is to obtain adjustment mechanism characterized by simplicity of construction and operation, which may readily be installed in existing brake systems.

Another object of the invention is to carry out automatic adjustment in a hydraulic brake cylinder as a substantially continuous operation.

A further object is to provide means for adjusting the brakes in infinite imperceptible steps upon each operation of the cylinder, if required.

A further object of the invention is to utilize in the adjustment mechanism the principle of a progressively lengthening liquid link.

A further object of the invention is to provide a pressure transmitting means acting upon the liquid link and having positive limits of motion corresponding to and defining the normal limits of motion of the extensible piston.

A further object of the invention in this connection is the provision of a pressure transmitting means embodying an expansible disc assembly which may be installed as a unit in the hydraulic cylinder and which permits a by-passing fluid flow at its expansion limit for lengthening of the liquid link.

Still another object of the invention is to present an adjustment mechanism applicable to the known types of hydraulic brakes without appreciable change of structure.

A further object of the invention is to provide a hydraulic mechanism possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is found the preferred but obviously not necessarily the only form of embodiment of the invention, Fig. 1 is a sectional plan view of a wheel brake assembly of one known type, showing a hydraulic cylinder in accordance with the instant invention for actuation of the brake.

Fig. 2 is a sectional view through the cylinder of Fig. 1.

Fig. 3 is a perspective view of the disc assembly in the cylinder of Fig. 2.

Fig. 4 is a view similar to Fig. 1, showing the invention as applied to another known type of brake; and Fig. 5 is a sectional view through a cylinder of Fig. 4.

Like parts are indicated by similar characters of reference throughout the several views.

The invention is disclosed in connection with hydraulic braking apparatus for automobiles and like devices. It is shown as embodied in two of the more commonly known and used hydraulic brake systems.

Referring first to that shown in Figs. 1, 2 and 3 (commonly known as a "Lockheed" brake), a cylindrical brake drum 11 carried by a wheel is mounted in surrounding relation to a pair of oppositely disposed segmental brake shoes 12. At their lower ends the shoes 12 are pivotally connected to a carrier plate 13, the opposite ends being interconnected by a tension spring 14.

The shoes 12 present arcuate flanges 15 overlaid with a facing material 16 for contact with the drum 11. Influenced by the spring 14, the shoes 12 normally occupy a retracted position as shown. A braking operation is effected by spreading apart the shoes to press the facing material 16 into frictional engagement with the internal surface of the drum.

Motion of the brake shoes 12 relative to the drum 11 is effected by or under the control of hydraulic actuating means including a wheel cylinder 17. Mounted upon the carrier plate 13 between the upper or outer ends of the shoes 12 a pair of oppositely disposed pistons 18 and 19 (Fig. 2) in the cylinder 17 carry stem or rod portions 21 and 22 respectively, extensible from the opposite ends of the cylinder into operative engagement with the shoes 12.

Approximately mid-way along its length the cylinder 17 has a radial port or opening 23 receiving one end of a fluid conduit 24. The conduit 24 leads from a source of hydraulic fluid selectively placed under pressure, for example, by operation of the master cylinder of conventional hydraulic braking systems. Within the cylinder 17 the space between the pistons 18 and 19 is filled with the hydraulic fluid so that pressure applied within the master cylinder is transmitted through the conduit 24 to the interior of cylinder 17. It is then effective to extend the pistons 18 and 19, thereby forcing the brake shoes 12 outward into contact with the drum 11.

Mounted on the inner ends of the pistons 18 and 19 are respective cup leathers 25 and 26 facing toward the inlet opening 23 or in a direction opposed to the direction of application of the fluid pressure.

In the absence of other controls, the pistons 18 and 19 are fully retracted under the influence of the spring 14 when the pressure in cylinder 17 is released. Accordingly, as the facing 16 on the brake shoes 12 is reduced by wear, a progressively greater outward travel of the pistons is required to effect a braking operation. As a result, the braking system becomes "soft" and unreliable. The instant invention contemplates an automatic adjustment within the cylinder 17 to compensate for wear of the brake shoes.

The adjustment mechanism comprises, as shown in Figs. 2 and 3, an expansible disc assembly including a pair of oppositely facing spaced apart discs 27 and 28 and an intermediate snap ring 29. The ring 29 is of split construction radially expansible into a peripheral groove 31 in the interior of the cylinder in such wise as to be locked against axial movement.

The discs 27 and 28 are arranged on opposite sides of the ring 29 and are interconnected for limited relative axial movement by a screw stud 32. The shank of stud 32 is passed through a central opening 33 in the disc 27 and through the ring 29 into screw threaded engagement with a complementary threaded opening 34 in the disc 28. The head of the screw stud 32 is engageable with a counterbored seat 35 surrounding opening 33 in disc 27 to limit relative outward or expansion movement of the discs. Relative inward travel or compression of the disc assembly may be limited by cooperative engagement between inwardly facing bosses on the discs. In accordance with the instant invention the extent of movement permitted the discs 27 and 28 is predetermined to correspond to and normally to define the extent of movement of the brake shoes into and out of contact with the brake drum.

Intermediate discs 27 and 28 is a compression spring 36 surrounding the shank of stud 32 and urging the discs 27 and 28 outwardly one relative to the other. The spring 36 is weaker than spring 14 and is overcome by the latter in the absence of applied fluid pressure in the system.

The groove 31 which receives the snap ring 29 and locates the disc assembly is in registry with or adjacent to the fluid inlet opening 23. Accordingly, pressure fluid supplied the cylinder 17 enters between the discs 27 and 28 and exerts an expansive force thereon.

The discs 27 and 28 are spaced longitudinally from their associated pistons 18 and 19 and define in conjunction therewith respective intermediate pressure chambers 37 and 38. The pressure chambers being filled with incompressible hydraulic fluid, liquid links are established between the discs 27 and 28 and the pistons 18 and 19 through which the expansive movements of the discs are transmitted to the pistons as a force for extension thereof. The discs 27 and 28 have a loosely sliding fit in the cylinder 17 enabling a by-pass of fluid around the peripheries of the discs into the chambers 37 and 38.

Pressed against the outer surfaces of the respective discs 27 and 28 by associated springs 39 and 41 are cup leathers 42 and 43, the springs being interposed between the opposed cup leathers 42—25 and 43—26, respectively. The construction and arrangement is such that fluid by-passed around the discs 27 and 28 into the pressure chambers 37 and 38 is prevented from returning to the inlet and so increases the volume and therefore the size of the respective pressure chambers.

In the operation of the system, the brake shoes 12 normally are retracted from the drum 11 a distance which is a function of and corresponds to the amount of inward travel permitted the discs 27 and 28 within the cylinder 17. The retractive influence of the spring 14 is effective through the pistons 18 and 19 and the liquid links in chambers 37 and 38 to compress the disc assembly, moving discs 27 and 28 inward against the resistance of spring 36. Now, if pressure is applied through conduit 24 to initiate a braking operation, the incoming pressure fluid at inlet 23 expands the disc assembly, moving the discs 27 and 28 outward. The expansive force of the discs applied through the liquid link in chambers 37 and 38 extend the pistons 18 and 19 outward. The spacing between the brake shoes 12 and drum 11 being related to the permitted travel of discs 27 and 28, the shoes make contact with and press against the drum as the discs reach their outer limit of movement.

If preceding braking operations have worn the facing on the shoes 12, the extent of travel required of the brake shoes to properly engage the drum 11 exceeds the outward travel of the discs 27 and 28 as positively limited by stud 32. When the discs reach such limit of travel, therefore, a pressure differential exists between the inlet 23 and the chambers 37 and 38 resulting in a by-passed flow of fluid around the discs into the pressure chambers. Continued extension of the pistons 18 and 19, independently of the discs 27 and 28, thus is accomplished and the required added movement of the brake shoes so attained. Upon release of fluid pressure in the system the spring 14 retracts the brake shoes and pistons 18 and 19, but because the by-passed quantity of fluid added to the chambers 37 and 38 is trapped therein, the extent of return movement corresponds only to the extent of motion of the discs 27 and 28. The brake shoes accordingly assume a new starting position in which the forces generated by expansion travel of the discs 27 and 28 again are adequate to effect the braking operation.

It is to be noted that in a broad sense there is accomplished a continuous automatic adjustment of the hydraulic actuating mechanism and of the brake shoes in response to and as a result of wear of the brake facing material. As such wear occurs, a corresponding and continuous lengthening of the liquid links in chambers 37 and 38 takes place and the spacing between the brake shoes and brake drum remains substantially constant.

Referring to Figs. 4 and 5, application of the invention to the second considered type of hydraulic brake (commonly known as a "Bendix" brake) involves a utilization of the same principle of operation in substantially the same kind of construction.

In Fig. 4, a brake drum 45 carried by a wheel is mounted in surrounding relation to a pair of segmental brake shoes 46. The upper ends of the shoes 46 are loosely pivoted upon a fixed stud 47 while the lower ends are connected to the opposite ends of a hydraulic adjusting cylinder 48. A series of interconnecting springs 49 and 51 urge the shoes 46 to a retracted position relatively to the drum.

Adjacent their upper ends the shoes 46 are operatively engaged by pistons 52 and 53 reciprocable within a cylinder 54 supplied with hydraulic fluid by a conduit 55. A flexible conduit 56 connects the brake actuating cylinder 54 to the adjusting cylinder 48 so that the shoes 46 may be extended by forces acting simultaneously upon the upper and lower ends thereof.

The cylinder 54 may be constructed and arranged like the actuating cylinder shown in Figs. 1, 2 and 3, or it may function without benefit of automatic adjustment. The cylinder 48, as shown in Fig. 5, is directly connected at one end to one of the shoes 46, while a piston 57 therein is extensible from the opposite end and connected to the other of the shoes 46. The former end of the cylinder is closed to define with the piston 57 an intermediate space filled with hydraulic fluid. The conduit 56 supplies pressure fluid to the cylinder 48 through an inlet opening 58 adjacent the closed end of the cylinder.

Having a loose fit in the cylinder in registry with inlet opening 58 is a disc assembly comprising spaced discs 59 and 61 urged apart by a coil spring 62. Inwardly projecting sleeves on the discs 59 and 61 are in telescoping relation, the discs being held in assembled position by a screw stud 63. The construction and arrangement is such that limited relative reciprocal motion of the discs is permitted, such motion being predetermined to correspond to and define the retracting and advancing movement of the brake shoes relatively to the brake drum.

The disc 61 seats upon the closed end of the cylinder, while the disc 59 defines in conjunction with piston 57 a pressure chamber 64. Pressed against the outer surface of the disc 59 by a coil spring 65 is a cup leather 66 facing piston 57. The opposite end of spring 65 holds an oppositely facing cup leather 67 in engagement with the piston 57.

In the operation of a cylinder in accordance with this form of the invention, pressure fluid admitted between the discs 59 and 61 effects an expansion of the disc assembly to effect a relative axial movement between the cylinder and piston 57, pressure being applied to piston 57 through disc 59 acting on the liquid link represented by pressure chamber 64. The screw stud 63 limits the expansion movement of the disc assembly and such additional travel of the piston 57 as may be required to properly engage the brake shoes with the brake drum is accomplished by by-passing fluid around discs 59 into chamber 64. Return flow being prevented by the cup leather 66, the liquid link connecting disc 59 and piston 57 is lengthened in accordance with the additional travel required of the brake shoes. A substantially constant relationship between the brake shoes and brake drum is thereby maintained irrespective of wear.

Among the important and advantageous features of the invention is the fact that simplified modification of existing brake apparatus so as to incorporate the present adjusting mechanism therein is both possible and feasible. In the case of the first considered type of brake, the conventional hydraulic cylinder includes merely the opposing pistons 18 and 19 and associated cup leathers. To modify the cylinder for operation in accordance with this invention, it is only necessary to turn the groove 31 therein and insert the disclosed disc assembly plus cup leathers 42—43 and springs 39—41.

In the case of the second described type of brake, the cylinder 48 and associated parts replaces a manually adjustable connector ordinarily mounted between the lower ends of the brake shoes. In addition to making that substitution, an opening is tapped in the upper cylinder 54 and the two cylinders interconnected by the conduit 56.

Thus, the present invention not only provides a very efficient and satisfactory brake adjusting mechanism as has been proven by actual operation, but a very economical and simple means is provided for incorporation of the adjusting mechanism in existing brake assemblies.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a hydraulically operated brake mechanism having relatively movable cooperating brake members, adjustable actuating means therefor including a power cylinder, fluid pressure operated piston means therein the movement of which results in relative movement of the cooperating brake members, means for supplying fluid under pressure to said power cylinder, a self limiting disc assembly mounted in said cylinder to be expanded by incoming pressure fluid, said disc assembly including a pair of opposed discs, a spring pressing said discs outward or apart and axially adjustable means interconnecting said discs, means adjustably interconnecting said disc assembly with said piston means comprising a fluid link intermediate said disc assembly and piston means, and means for progressively and automatically increasing the size of said fluid link in response to the need for greater relative travel of the cooperating brake members.

2. Brake mechanism according to claim 1, characterized in that said disc assembly comprises opposing discs in unitary telescopic connection and a bolt adjustably carried by one of said discs and engageable with the other to limit relative separating motion of the discs.

3. An actuating cylinder for the application of hydraulic forces in opposite directions, comprising a cylinder normally filled with an incompressible fluid, a pressure fluid inlet opening in said cylinder midway between the ends thereof, first and second oppositely disposed pistons in said cylinder extensible from the opposite ends thereof, a disc assembly spaced centrally between said pistons including a pair of spaced discs having a loose fit in said cylinder and arranged to receive the pressure fluid entering said inlet therebetween, a cup washer associated with each said discs facing the associated piston to permit a flow of pressure fluid from the inlet into the spaces between the discs and pistons but to inhibit reverse flow, aligned axial openings in said discs, the opening in one of said discs being threaded, and a bolt screwed into said threaded opening and extending through and beyond the other of said openings, the extending end of said bolt presenting a head making expanding motion of the disc assembly under fluid pressure self limiting and adjustable in length.

4. An actuating cylinder according to claim 3, characterized by an annular recess in the interior of said cylinder intersecting the inlet opening, and a locating ring seated in said recess.

BURLIN W. OSWALT.

References Cited in the file of this patent

UNITED STATES PATENTS

| Number | Name | Date |
|---|---|---|
| 2,189,134 | Chard | Feb. 6, 1940 |
| 2,240,792 | Liebreich | May 6, 1941 |
| 2,255,974 | Hoyt | Sept. 16, 1941 |